United States Patent [19]

Haubennestel et al.

[11] Patent Number: 4,647,647
[45] Date of Patent: Mar. 3, 1987

[54] ADDITION COMPOUNDS SUITABLE AS DISPERSING AGENTS, PROCESSES FOR THEIR PREPARATION, THEIR USE AND SOLIDS COATED THEREWITH

[75] Inventors: Karlheinz Haubennestel; Peter Kramp, both of Wesel, Fed. Rep. of Germany

[73] Assignee: BYK-Chemie GmbH, Wesel, Fed. Rep. of Germany

[21] Appl. No.: 685,384

[22] Filed: Dec. 24, 1984

[51] Int. Cl.$^4$ .................... C08G 18/30; C08G 18/72; C08G 18/76; C08G 18/77
[52] U.S. Cl. ................................. 528/83; 525/440; 528/59; 528/60; 528/61; 528/62; 528/63; 528/64; 528/65; 528/66; 528/70; 528/71; 528/73; 528/77; 528/80; 528/81; 528/82; 528/84; 528/85
[58] Field of Search .................. 522/440; 528/59, 60, 528/61, 62, 63, 64, 65, 66, 70, 71, 73, 77, 80, 81, 82, 83, 84, 85

[56] References Cited

U.S. PATENT DOCUMENTS 3,384,606 5/1968 Dieterich et al. .................... 525/440
4,328,325 5/1982 Marquardt et al. .................. 525/440
4,489,135 12/1984 Drexler et al. ....................... 525/440

*Primary Examiner*—Jacob Ziegler

*Attorney, Agent, or Firm*—Schwartz, Jeffery, Schwaab, Mack, Blumenthal & Evans

[57] ABSTRACT

Addition compounds suitable as dispersing agents, obtainable by the reaction of polyisocyanates having an average functionality of from 2.5 to 6 with monohydroxyl compounds, reaction of the resulting reaction product with compounds of the formula II $$G-(E)_n \qquad \text{II}$$

wherein E stands for —OH, —NH$_2$ and/or —NHR (wherein R represents an alkyl group with 1 to 4 carbon atoms) and n stands for 2 or 3, and G represents an aliphatic, cycloaliphatic and/or aromatic group, and further reaction of the reaction product thus obtained with compounds of the formula III $$Z-Q \qquad \text{III}$$

wherein Q stands for —OH, —NH$_2$, —NHR (wherein R stands for an alkyl group having 1 to 4 carbon atoms) or —SH, and Z denotes a group having at least one basic group containing nitrogen. The invention also relates to processes for the preparation of these addition compounds, their use, and pulverulent or fibrous solids which are coated with these dispersing agents and are to be incorporated in liquid systems.

37 Claims, No Drawings

ADDITION COMPOUNDS SUITABLE AS DISPERSING AGENTS, PROCESSES FOR THEIR PREPARATION, THEIR USE AND SOLIDS COATED THEREWITH

The present invention relates to addition compounds or their salts suitable as dispersing agents, obtainable by the reaction of polyisocyanates, hydroxyl compounds, compounds having zerewitinoff-active hydrogen and at least one basic group containing nitrogen, and optionally compounds containing amine hydrogen, optionally in the presence of solvents and optionally in the presence of reaction catalysts.

The invention further relates to the preparation of these addition compounds, their use as dispersing agents and pulverulent or fibrous solids which are coated with such dispersing agents and are to be incorporated in liquid systems.

Powerful mechanical forces are required for introducing solids into liquid media. This depends to a large extent on the ease with which the solid can be wetted by the surrounding medium and on the affinity to this medium. To reduce these forces required for dispersion, it is customary to employ dispersing agents which facilitate incorporation. These are in most cases surface-active substances, also known as tensides, which have an anion-active or cation-active or non-ionogenic structure. These substances are added in relatively small quantities, either by direct application to the solid or by introduction into the dispersing medium. The effort required for dispersion is substantially reduced by such a tenside.

It is also known that these solids tend to reagglomerate after the dispersion process, thus vitiating the effort previously expended for dispersion and leading to serious problems. This phenomenon is explained by London/van der Waal's forces by which the solids attract each other. To overcome these forces of attraction, it is necessary to apply adsorption layers on the solids. This is achieved by using such tensides.

During and after dispersion, however, an interaction between the solid particle and the surrounding medium takes place and desorption of the tenside occurs, accompanied by its replacement by the surrounding medium, which is present at a higher concentration. This surrounding medium, however, is in most cases not capable of building up such stable adsorption layers, and the whole system breaks down. This manifests itself by a rise in viscosity in liquid systems, loss of gloss and shift in colour tone in lacquers and coatings, insufficient development of colour power in pigmented plastics, and loss of mechanical strength in reinforced plastics.

Dispersing agents have been proposed for solving this problem, e.g. in U.S. Pat. No. 4,032,698, Nos. GB-A-1 393 401 and GB-A-1 383 402. These dispersing agents, however, provide only partial solutions, in particular with regard to the ability of different pigments, such as organic and inorganic pigments, to be mixed together without flocculating. Moreover, pigment pastes prepared by the processes described tend to interact with the surrounding medium, for example, when they are used in lacquers. It may thus be assumed that the adsorption layers which are built up have insufficient stability against desorption.

It is an object of the present invention to find dispersing agents which do not have the above disadvantages or only to a substantially less extent, and which result in the formation of dispersions of solids which do not tend, or only to a minor degree, to reagglomerate after the dispersion process.

It has now surprisingly been found that this problem may be solved by means of the addition products defined below.

The invention thus relates to addition compounds or their salts suitable as dispersing agents, obtainable by the reaction of polyisocyanates, hydroxyl compounds, compounds having zerewitinoff-active hydrogen and at least one basic group containing nitrogen, and optionally compounds containing amine hydrogen, optionally in the presence of solvents and optionally in the presence of reaction catalysts, characterised in that they are obtainable by the reaction of polyisocyanates having an average functionality of from 2.5 to 6

(a) in such a quantity with monohydroxyl compounds of the formula I $$Y—OH \qquad\qquad I$$

wherein Y has the following meanings:
(i) aliphatic and/or cycloaliphatic hydrocarbon groups with 8 to 30 carbon atoms in which the hydrogen atoms may be partly replaced by halogens and/or aryl groups,
(ii) aliphatic, cycloaliphatic and/or aromatic groups with molecular weights of from 350 to 8000 which contain at least one —O— and/or —COO— group and in which the hydrogen atoms may be partly replaced by halogens that from 15 to 50%, preferably 20 to 40% and most preferably 20 to 35% of the NCO groups are reacted, (b) reacting the resulting reaction product in such a quantity with compounds of the formula II $$G—(E)_n \qquad\qquad II$$

wherein E stands for —OH, —NH₂ and/or —NHR (wherein R represents an alkyl group having 1 to 4 carbon atoms) and n stands for 2 or 3, and G represents an aliphatic, cycloaliphatic and/or aromatic group with molecular weights of at the most 3000 which has at least 2 carbon atoms and may contain —O—, —COO—, —CONH—, —S— and/or —SO₂— groups, that a further 15 to 45%, preferably 20 to 40% and most preferably 20 to 35% of the NCO groups of the polyisocyanates originally put into the process are reacted but the sum of the degrees of NCO reaction of reactions (a) and (b) amounts to at least 40% and at the most 75%, preferably 45 to 65% and most preferably 45 to 55%, and (c) reacting the resulting reaction product in such a quantity with compounds of the general formula III $$Z—Q \qquad\qquad III$$

wherein Q stands for —OH, —NH₂, —NHR (wherein R stands for an alkyl group having 1 to 4 carbon atoms) or —SH, and Z is an aliphatic group with 2 to 10 carbon atoms containing at least one tertiary amino group or a heterocyclic group containing at least one basic ring nitrogen atom which carries no hydrogen atom, which heterocyclic group may be attached to the group Q by way of an alkylene group having up to 10 carbon atoms that at least one molecule of the compound Z—Q is available for each remaining isocyanate group which has not been reacted in stages (a) and (b).

The invention also relates to the process for the preparation of the addition compounds as described above.

The invention further relates to the use of the addition compounds described above as dispersing agents. The invention also relates to pulverulent or fibrous solids which are coated with these addition compounds as dispersing agents and are to be incorporated in liquid systems. Pulverulent or fibrous solids are of the kind which were coated with dispersing agents according to the state of the art, in particular organic and inorganic pigments used in paints, coating compounds, moulding compounds or other synthetic resins, and inorganic or organic fillers used for filling or reinforcing paints, coating compounds, moulding compounds or other synthetic resins. A sub-group of such fillers are formed by fibres of an organic and/or inorganic nature which are also used as fillers or reinforcing materials. Such pulverulent or fibrous solids having a coating of dispersing agents according to the invention are prepared in known manner but using the dispersing agents according to the invention instead of the dispersing agents known in the art. In the field of fibrous materials, these dispersing agents are frequently referred to as sizes. In this context, the solids may be coated with a solution or emulsion of the addition compounds according to the invention, e.g. in a fluidized bed. The solvent or emulsifying agent may subsequently be removed or it may be left in the mixture so that pastes are obtained. Another possibility consists, for example, of introducing the solids to be coated into a liquid medium to form a slurry and then adding the addition compounds according to the invention to this slurry. Formation of this slurry may also be carried out in such a manner that a workable paste is obtained, the liquid medium used for forming the slurry being, of course, adapted to the subsequent purpose of use of this paste, e.g. the pigment paste.

The addition compounds according to the invention may, however, also be used as dispersing agents in the same manner as known dispersing agents are used in the state of the art, in that they are added to the systems, e.g. lacquers, synthetic resin mixtures or the like, in which the solids which are to be incorporated, such as pigments, fillers or fibres, are already contained in a dispersed form.

The polyisocyanates used for the preparation of the addition compounds according to the invention are those already used in the state of the art in this technical field but they must have an average functionality of from 2.5 to 6. Examples of such polyisocyanates include those which may be obtained by the addition of diisocyanates to polyols, such as

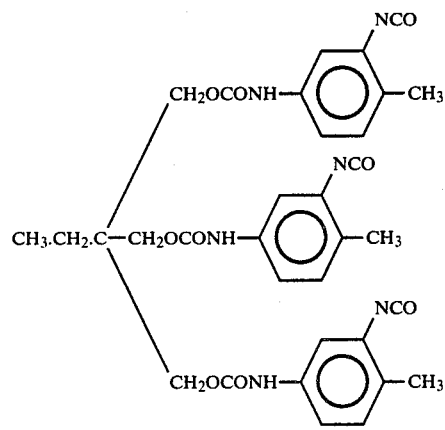

or those obtainable from diisocyanates by the biuret reaction, such as

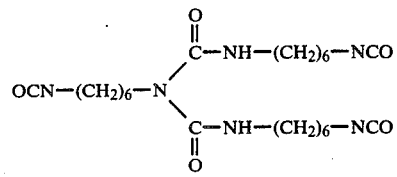

or polyisocyanates with an isocyanurate structure obtainable by the cyclisation of diisocyanates

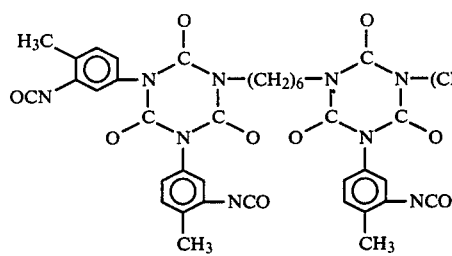

Trade product: Desmodur HL
(registered Trade Mark)

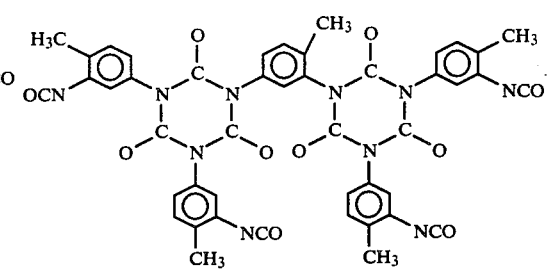

Trade product: Desmodur IL
(registered Trade Mark)

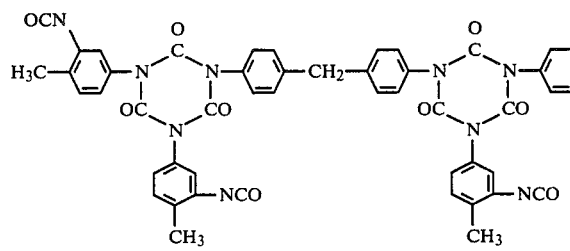

Trade product: Polurene KC (registered Trade Mark)

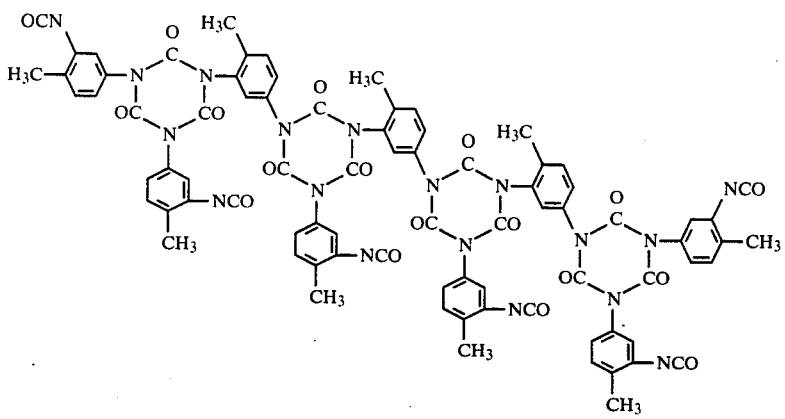

Trade product: Polurene HR (registered Trade Mark)

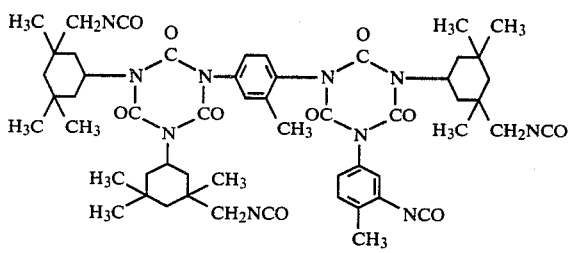

Tolylene diisocyanate-isophorone diisocyanate-isocyanurate
Company: SAPICI)

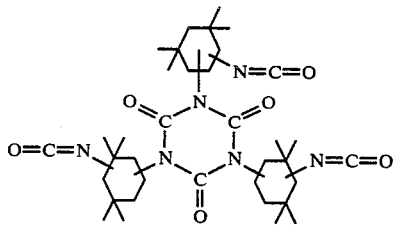

Trimeric isophoronediisocyanate (isocyanurate T1890 of Chemische Werke Huls)

As already mentioned above, the relevant compounds are trade products which frequently do not consist of compounds of the above chemical formulae in their pure form but are mixtures of certain compounds of a similar structure. By "average functionality" is meant that with regard to the isocyanate groups, the trade products have the given functionality of from 2.5 to 6, preferably 3 to 6. For example, a "functionality of 3" means that a molecule contains, on statistical average, 3 free isocyanate groups. The average functionality may be determined experimentally by determining the average molecular weight $M_n$. In addition, the isocyanate number is determined and the isocyanate equivalent weight is calculated from this number. The average functionality is the quotient of the average molecular weight and the isocyanate equivalent weight.

The monohydroxyl compounds of formula I may be aliphatic, cycloaliphatic and/or araliphatic compounds having in each case 8 to 30 carbon atoms. Mixtures of such compounds may also be used.

Straight chained or branched aliphatic or araliphatic compounds may be used. They may be saturated or unsaturated. Saturated compounds are preferred. The hydrogen atoms may be partly replaced by halogens, preferably by fluorine and/or chlorine. When such substituted compounds are used, they are preferably aliphatic monohydric alcohols. Such products are available commercially and, as is well known to the man of the art, generally have no halogen atoms on the carbon atoms close to the hydroxyl group. Examples of specially fluorinated alcohols include heptadecafluorodecanol or $C_6F_{13}CH_2CH_2OH$. The corresponding products available commercially are frequently not uniform but mixtures of different fluorinated compounds as obtained from technical synthesis.

The monohydroxyl compounds of formula I may contain at least one —O— and/or —COO—group, which means they are polyethers, polyesters or mixed polyether-polyesters. Examples of polyesters include those which may be obtained by the polymerisation of a lactone such as propiolactone, valerolactone, caprolactone or substituted derivatives thereof, using a monohydroxyl starting component. The starting components used may be monohydric alcohols, suitably with 4 to 30, preferably 4 to 14 carbon atoms, such as n-butanol, relatively long chained, saturated and unsaturated alcohols such as propargyl alcohol, oleyl alcohol, lineloyl alcohol, oxo alcohols, cyclohexanol, phenyl ethanol or neopentyl alcohol or fluorinated alcohols of the kind mentioned above. Alcohols of the type described above and substituted and unsubstituted phenols may also be converted into polyoxyalkylene monoalkyl-, aryl-, aralkyl- or cycloalkyl ethers by known methods of alkoxylation with ethylene oxide and/or propylene oxide, and these monohydroxypolyethers may be used in the manner prescribed as starting components for lactone polymerisation. Mixtures of the above mentioned compounds may in all cases be used.

This lactone polymerisation is carried out by known methods at temperatures of about 100° C. to 180° C., initiated, for example, by p-toluenesulphonic acid or dibutyl tin dilaurate, and proceeds according to the following mechanism:

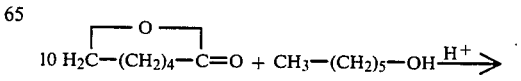

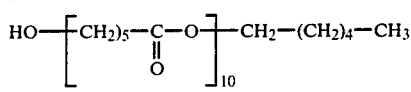

These polyesters suitably have a molecular weight in the region of about 350 to 8000, preferably 500 to 5000, compounds obtained by lactone polymerisation carried out as described above being preferred. The alcohols used as starting components are preferably saturated monohydric alcohols having 4 to 18 carbon atoms.

Other examples of polyesters include those which may be obtained by the condensation of a glycol and a dibasic acid in the presence of monohydroxyl compounds. The formation of dihydroxypolyesters may be suppressed by using the appropriate stoichiometric quantities of monohydroxyl compounds as described above. The reaction then proceeds according to the mechanism illustrated by the following example:

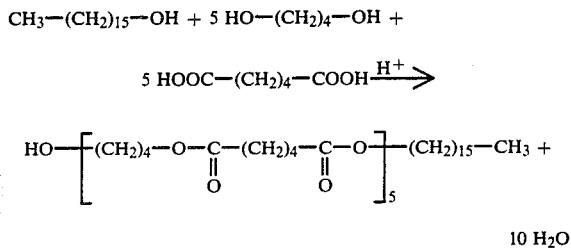

These polyesters suitably have an average molecular weight of from 400 to 2500, preferably from 800 to 1500.

A further example is provided by polyesters which are obtainable by the condensation of a hydroxycarboxylic acid in the presence of monohydroxyl compounds of the kind described above for controlling the molecular weight. The reaction then proceeds according to the mechanism illustrated by the following example:

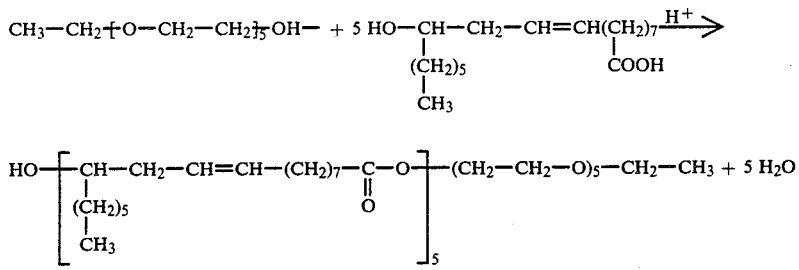

In this case, the average molecular weight of the polyester is suitably from 600 to 3000, preferably from 800 to 1500.

The compounds of formula I may also be monohydroxypolyethers of the kind obtained by the alkoxylation of alkanols, cycloalkanols and phenols. These polyethers suitably have a molecular weight in the region of about 350 to 1500.

The reaction of the polyisocyanates with the compounds of formula I thus results in a proportion of the free isocyanate groups undergoing reaction with the hydroxyl groups of the compounds of formula I. On average, at least 0.8, preferably about 1 molecule of formula I should react for each molecule of polyisocyanate so that about one compound of formula I is attached to each polyisocyanate molecule. When polyisocyanates having an average functionality greater than 3 are used, a larger quantity of compounds of formula I may be used. What is important is that of each molecule of polyisocyanate, at least two isocyanate groups, and in the case of polyisocyanates having an average functionality less than 4, about 2 isocyanate groups should remain unreacted, and of these unreacted isocyanate groups, in the simplest case about one isocyanate group is used for cross-linking with compounds of formula II in subsequent reactions and about one isocyanate group is reacted with compounds of formula III. Depending on the functionality of the polyisocyanates used and of the compounds of formula II, the individual quantitative proportions may be selected by suitably applying the principles just outlined.

The reaction product obtained is then reacted with compounds of the formula II. This reaction may be carried out in the same vessel as the reaction with compounds of formula I. In some cases, the polyisocyanates may be reacted with a mixture of compounds of formula I and formula II. Reaction (a) with compounds of formula I thus results in the reaction of 15 to 50% of the NCO groups of the polyisocyanates originally put into the process. The lower limit is preferably 20%. The upper limit is preferably 40%, most preferably 35% and in some cases only 30%.

When reaction (b) takes place with compounds of the formula II, a further 15 to 45% of the NCO groups of the polyisocyanates originally put into the process are reacted. The lower limit is preferably 20%. The upper limit is suitably 40%, preferably 35% and in some cases preferably 30%.

In reactions (a) and (b) together, however, at least 40% and not more than 75% of the NCO groups of the polyisocyanates originally put into the process are reacted, the lower limit being preferably at 45%. The upper limit is suitably at 65%, preferably at 55% and in some cases preferably at 50%. If, for example, according to (a), the isocyanates originally put into the process are reacted with compounds of formula I in such quantities that 15% of the NCO groups are reacted, the compounds of formula II must be used in such quantities in reaction (b) that at least 25% of the NCO groups of the polyisocyanates originally put into the process undergo reaction, giving a total of 15+25=40%.

The compounds of formula II essentially differ from those of formula I in that they contain two or three functional groups which react with the isocyanate groups. These functional groups are preferably hydroxyl groups because compounds of this kind are readily available and obtainable commercially and the reaction products obtained are readily soluble in solvents which may be used in the subsequent application of the dispersing agents according to the invention.

Examples of compounds of formula II are: Diols and triols, diamines, dialkanolamines, monoalkanolamines with 2 to 12 carbon atoms, dihydroxydialkylsulphides and dihydroxysulphones, e.g. butanediol, hexanediol, cyclohexanedimethanol, neopentyl glycol, ethylene glycol, alkyl-substituted dialkanolamines, glycerol, trimethylol propane, fatty acid dialkanolamides, thiodiglycol, di-(4-hydroxyphenyl)-sulphone. A preferred group of compounds of formula II are the polyoxyalkylene glycols, preferably with alkylene moieties having 2 to 4, preferably 2 carbon atoms, and preferably with molecular weights in the range of from 400 to 2000, preferably from 600 to 1500. Ethoxylates with 3 hydroxyl groups are obtained by polymerisation, using trifunctional alcohols as starting components. Polyethylene glycols are preferred polyoxyalkylene glycols.

The compounds of formula II may be compounds which are obtainable by the polymerisation of a lactone, as already mentioned above, using dihydroxy or trihydroxy starting components. These polyester polyols suitably have an average molecular weight $M_n$ of from 800 to 2000. Butanediol or ethylene glycol is preferred as starting components but the diols or triols mentioned above may also be used as starting components.

The compounds of formula II bring about a crosslinking between the reaction products of polyisocyanate and compounds of formula I. In the simplest case, the starting products are used in such quantities that the compounds of formula II constitute the centre of the molecule and the polyisocyanates are attached to the compounds of formula II by way of the groups E while the remaining isocyanate groups have reacted with or undergo reaction with compounds of formula I and formula III, respectively. A certain amount of excess cross-linking or subequivalent cross-linking may, of course, occur. For this reason, the number of molecules of polyisocyanate to one molecule of formula II may range from 0.8 n to 1.1 n (n has the same meaning as in formula II).

Excess cross-linking may be prevented to a certain extent by operating in dilute solutions in strongly polar, aprotic solvents such as dimethylformamide, dimethyl acetamide or N-methylpyrrolidone.

The reaction products thus obtained are reacted in such a quantity with compounds of formula III that at least one molecule of formula III is available for each remaining isocyanate group which has not yet reacted in stages (a) and (b). If the compounds of formula III contain only one group capable of reacting with isocyanate groups, an excess is not required, and indeed, about one molecule of formula III is used to each as yet unreacted isocyanate group. If the compounds of formula III contain more than one group capable of reacting with isocyanates, it is sufficient to provide one molecule of formula III to each as yet unreacted isocyanate group although less than the equivalent quantity should not be used because undesirable cross-linking might then occur. A slight excess may be advisable to prevent unwanted cross-linking. An excess of about 10, preferably 5 mol-% is generally sufficient. In formula III, Q preferably stands for —NH$_2$. Furthermore, Z in formula III is preferably a mononuclear or dinuclear heterocyclic group having a ring nitrogen atom which is attached to the group Q, preferably by way of an alkylene group having 2 to 5 carbon atoms. Preferred heterocyclic groups are triazole, pyrimidine, imidazole, pyridine, morpholine, pyrrolidine, piperazine, benzimidazole, benzothiazole and/or triazine. They may have substituents, such as up to 3, preferably 1 of the following groups: Alkyl and/or alkoxy groups having 1 to 6, preferably 1 to 4 carbon atoms (a methoxy group being preferred), amino groups (this leads to compounds which are polyfunctional in their reaction with isocyanates).

The heterocyclic groups mentioned above may be directly attached to the group Q but they may also be attached by one of the groups conventionally used for this purpose, such as alkylene groups having 2 to 8, preferably 2 to 4 carbon atoms or polyether groups having the same number of carbon atoms. The same applies to the tertiary amino group. The compounds used as compounds of formula III may in principle be any which have already been used in this field of the art for the preparation of other dispersing agents, e.g. as described in U.S. Pat. No. 4,032,698. The following are examples of compounds of formula III: N,N-Diethyl-1,4-butanediamine, 1-(2-aminoethyl)-piperazine, 2-(1-pyrrolidyl)-ethylamine, 4-amino-2-methoxy-pyrimidine, 2-dimethylaminoethanol, 1-(2-hydroxyethyl)-piperazine, 4-(2-hydroxyethyl)-morpholine, 2-mercaptopyrimidine, 2-mercaptobenzimidazole. The following are particularly preferred: N,N-dimethyl-1,3-propanediamine, 4-(2-aminoethyl)-pyridine, 2-amino-6-methoxybenzothiazole, 4-(aminomethyl)-pyridine, N,N-diallyl-melamine, 3-amino-1,2,4-triazole, 1-(3-aminopropyl)-imidazole, 4-(2-hydroxyethyl)pyridine, 1-(2-hydroxyethyl)-imidazole, 3-mercapto-1,2,4-triazole. It is characteristic of these compounds that they contain at least one Zerewitinoff-active hydrogen atom per molecule, which hydrogen atom preferably reacts with the isocyanate groups, and that they in addition contain a basic group which contains nitrogen and which is not capable of reacting with isocyanate groups to form urea. These basic groups are also characterised according to the state of the art by their pKa-value (see U.S. Pat. Nos. 3,817,944; 4,032,698 and 4,070,388). Compounds with basic groups having a pKa-value of from 2 to 14 are preferred, especially those with pKa-values of from 5 to 14 and most especially those with pKa-values of from 5 to 12. The pKa-value can be obtained from tables. The limiting values given above refer to the measurement of the pKa-value at 25° C. at an 0.01 molar concentration in water. These basic groups also impart a basicity to the addition compounds according to the invention, as is known in this field of the art (see the above mentioned US Patent Specifications). Due to these basic groups, the addition compounds are capable of salt formation. According to the invention, they may also be used in the form of such salts as dispersing agents.

These salts are obtained from the resulting reaction product by neutralisation with organic or inorganic acids or by quaternisation. Salts with organic monocarboxylic acids are preferred.

All the reactions may, as in the state of the art, be carried out in the presence of suitable solvents which do not interfere with the reaction, e.g. hydrocarbons such as xylenes, ethers, including dioxane and dimethylformamide, etc. The reactions may also be carried out in the presence of conventional catalysts such as dibutyl tin dilaurate, iron acetyl acetonate or triethylenediamine. Reference may be had in this connection to the Patent Specifications cited above.

By varying the substituents of formulae I and II and/or their quantitative proportions, the compatibility of the addition compounds according to the invention may be adjusted to a wide variety of polymer compounds used in coating and moulding formulations in which the addition compounds according to the invention are employed. If, for example, the binder in a lacquer is a polyester, the addition compounds according to the invention used in such a binder should, by virtue of the groups present in the starting compounds of formulae I and II, also contain in their molecule polyester groups or similar groups which are known to the man of the art to be compatible with polyesters. The same applies in analogous manner, for example, to polyethylenes or polyamides. Addition compounds according to the invention which contain only slightly polar groups are particularly compatible with these compounds. The same applies analogously to substituents of formula III, which have a particular influence on the affinity of the addition compounds according to the invention for the pigments which are to be dispersed.

The preparation of compounds of formula I is illustrated in the examples of preparation A to G given below.

Parts are parts by weight unless otherwise stated. In compounds such as polymers in which the molecules are not uniform, the molecular weights given are average values in terms of numerical averages ($M_n$). The molecular weights or average molecular weights $M_n$ may be determined by the usual methods, e.g. by determining the OH number or the amine number or kryoscopically.

The NCO content of the polyisocyanates used in the process and the course of the reaction of addition are determined by methods such as those described in "The Chemistry of Cyanates and their Thioderivatives" by Paul Patai, Part 1, Chapter 5, 1977.

The heterocyclic groups of compound III, which are represented by the symbol Z, may be attached to the group Q either directly or by way of an alkylene group, as already mentioned above. These heterocyclic groups are preferably attached to the group Q by way of a ring nitrogen atom and an alkylene group, preferably one having 2 to 5 carbon atoms. The heterocyclic group may, of course, contain other hetero atoms in addition to this ring nitrogen atom, including further ring nitrogen atoms. These additional ring nitrogen atoms may also carry a hydrogen atom (e.g. in the case of N-alkylpiperazine). The heterocyclic groups may, however, be attached to the group Q by means of a ring carbon atom, as in the case of benzimidazole, optionally by way of an alkylene group. The nature of the linkage depends to a large extent on the particular constitution of the heterocyclic groups and the reactivities of the individual atoms, as is well known to the organic chemist.

EXAMPLE OF PREPARATION A 2.1 Parts of a commercial heptadecafluorodecanol having an average molecular weight of 445 are homogenised with 5.9 parts of 2-ethylhexanol and 92 parts of valerolactone at 60° C. under a protective atmosphere. 0.004 parts of dibutyl tin dilaurate are added and the reaction mixture is heated to 180° C. within one hour. The reaction mixture is stirred at this temperature until a solids content of 98% is obtained.

The colourless to slightly yellowish product is solid at room temperature and melts at 60° to 70° C.

EXAMPLE OF PREPARATION B 11.1 Parts of phenyl ethyl alcohol and 88.9 parts of caprolactone are homogenised in the reactor at room temperature and 0.002 parts of dibutyl tin dilaurate is added as catalyst under nitrogen. The reaction mixture is heated to 160° C. within one hour and stirred at this temperature. The reaction is terminated as soon as a solids content of 99% is reached.

The polyester may be handled as a 100% product with a melting range of from 50° to 60° C. or, for example, as a 50% mixture in xylene. The latter modification is solid at room temperature with a melting range of from 40° to 50° C.

EXAMPLE OF PREPARATION C 7.2 Parts of n-octanol, 92.8 parts of caprolactone and 0.003 parts of dibutyl tin dilaurate are homogenised under a protective atmosphere and heated to 160° C. within one hour. The addition reaction is terminated as soon as a solids content above 99% is reached. At this temperature this solids content is reached after 10 to 12 hours. The product is a colourless solid at room temperature and melts at 50° to 60° C.

EXAMPLE OF PREPARATION D 2.9 Parts of isononanol, 97.1 parts of caprolactone and 0.002 parts of dibutyl tin dilaurate are homogenised under a protective atmosphere and heated to 170° C. within one hour. The addition reaction is terminated as soon as the solids content rises above 99.5%, which is attained after 8 to 10 hours. The product is a colourless solid at room temperature and melts at 60° to 70° C.

EXAMPLE OF PREPARATION E 10.5 Parts of n-octanol, 89.5 parts of 12-hydroxystearic acid and 0.04 parts of tetrabutyltitanate are homogenised with 100 parts of xylene with exclusion of oxygen (12-hydroxystearic acid: OH number 160 mg KOH/g, acid number 182 mg KOH/g). The reaction mixture is heated under normal pressure and the water of reaction formed is distilled off azeotropically within 7 to 10 hours. The product may be used for further reaction in the form in which it is obtained. To produce the 100% product, the solvent is carefully drawn off under vacuum.

EXAMPLE OF PREPARATION F

38 Parts of adipic acid, 52.7 parts of dodecanediol, 9.3 parts of octanol, 0.01 parts of p-toluenesulphonic acid and 30 parts of toluene are homogenised and heated. The water of reaction formed is removed from the equilibrium by azeotropic distillation within 5 to 6 hours, the temperature reaching 140° to 150° C. The solvent is then carefully drawn off under vacuum. The polyester is solid at room temperature and melts at 70° to 80° C.

EXAMPLE OF PREPARATION G 23.4 Parts of an alkali-free and dehydrated nonyl phenol ethoxylate having an average molecular weight of 445 are homogenised with 76.6 parts of caprolactone and 0.004 parts of dibutyl tin dilaurate under a protective atmosphere. The reaction mixture is heated to 150° C. and stirred at this temperature for 20 hours. The colourless, waxy product has a solids content of 98%.

EXAMPLES OF PREPARATION FOR COMPOUNDS OF FORMULA II

Example of Preparation I 9.6 Parts of trimethylolpropane and 90.4 parts of caprolactone are reacted at 170° C. for 6 to 8 hours after the addition of 0.003 parts of dibutyl tin dilaurate as catalyst until a polyester having an average molecular weight of 1400 is obtained.

Example of Preparation II

9 Parts of 1,4-butanediol, 91 parts of caprolactone and 0.002 parts of dibutyl tin dilaurate are homogenised under a protective atmosphere and heated to 160° C. within one hour. The addition reaction is terminated at this temperature as soon as the solids content rises above 99%. The resulting polyester diol has an average molecular weight of 1000.

EXAMPLE 1

7.2 Parts of Desmodur N (75% in ethyl glycol acetate/xylene 1:1) are homogenised under a protective atmosphere with 10 parts of ethyl glycol acetate and 16.9 parts of a caprolactone polyester having an average molecular weight of 1800 (Example of Preparation C) dissolved in 20 parts of xylene, 0.004 parts of dibutyl tin dilaurate are added and the reaction mixture is stirred at 60° C. until the OH groups have completely reacted.

For the cross-linking reaction, the reaction mixture is diluted with 10 parts of xylene, and 0.8 parts of 1,12-diaminododecane dissolved in 10 parts of N-methylpyrrolidone are rapidly added.

When 66% of the NCO groups originally put into the process have undergone reaction, the reaction mixture is diluted with 13.2 parts of xylene, and 1.9 parts of N,N-diallyl melamine dissolved in 10 parts of N-methylpyrrolidone are added. The reaction mixture is heated to 70° C. and stirred at this temperature for one hour.

The end product has a medium viscosity and is a colourless, clear to slightly cloudy substance.

EXAMPLE 2

Under a protective atmosphere, 10.4 parts of Desmodur N (75% in ethyl glycol acetate/xylene 1:1) are diluted with 10 parts of ethyl glycol acetate, and 15 parts of a caprolactone polyester having an average molecular weight of 1100 (Example of Preparation B) dissolved in 20 parts of xylene are added. After the addition of 0.004 parts of dibutyl tin dilaurate, the reaction mixture is heated to 60° C.

When 33% of the NCO groups put into the process have undergone reaction, 0.6 parts of trimethylolpropane dissolved in 30 parts of xylene are added.

As soon as 66% of the NCO groups have reacted, 1.6 parts of 4-(2-hydroxyethyl)-pyridine dissolved in 12.4 parts of ethyl glycol acetate are added, and the reaction mixture is heated to 70° C. and stirred at this temperature for one hour. The end product is colourless and has a medium viscosity.

EXAMPLE 3

10.3 Parts of Desmodur N (75% in ethyl glycol acetate/xylene 1:1) are homogenised under a protective atmosphere with 20 parts of ethyl glycol acetate and 10.2 parts of a commercial methoxypolyethylene glycol having an average molecular weight of 750 dissolved in 15 parts of xylene, 0.004 parts of dibutyl tin dilaurate are added and the reaction mixture is heated to 50° C.

After one third of the NCO groups have reacted, 5.4 parts of polyethylene glycol 800 dissolved in 15 parts of xylene are added.

When 66% of the NCO groups put into the process have reacted, the reaction mixture is diluted with 12.4 parts of xylene, and 1.7 parts of 1-(2-aminoethyl)-piperazine dissolved in 10 parts of ethyl glycol acetate are added. The reaction mixture is stirred at 70° C. for 2 hours. The product is yellowish and slightly viscous.

EXAMPLE 4

9.1 Parts of Desmodur N (75% in ethyl glycol acetate/xylene 1:1), 17.7 parts of ethyl glycol acetate, 0.003 parts of dibutyl tin dilauarate and 13 parts of a caprolactone polyester with an average molecular weight of 1100 (Example of preparation B) dissolved in 10 parts of xylene are homogenised under a protective atmosphere and heated to 50° C. After chemical addition of the polyester, 3.7 parts of an ethoxylated oleylamine having an average molecular weight of 630 dissolved in 30 parts of xylene are added. As soon as 65% of the NCO groups have reacted, 1.5 parts of 4-(2-aminoethyl)-pyridine dissolved in 15 parts of N-methylpyrrolidone are added and the mixture is stirred for one hour to complete the reaction.

EXAMPLE 5

7.6 Parts of Desmodur N (75% in ethyl glycol acetate/xylene 1:1) 18.1 parts of xylene and 13.8 parts of a polyester of adipic acid, dodecane diol and octanol having an average molecular weight of 1400 (Example of Preparation F) dissolved in 10 parts of xylene are homogenised under a protective atmosphere, 0.003 parts of dibutyl tin dilaurate are added and the reaction mixture is heated to 40° C. When 30% of the NCO groups have reacted, 4.5 parts of the trimethylolpropane-caprolactone polyester described in Example of preparation I, dissolved in 30 parts of xylene, are added.

After addition of the hydroxyl groups, 1 part of N,N-dimethyl-1,3-propanediamine dissolved in 15 parts of N-methylpyrrolidone is added and the reaction mixture is heated to 60° C. and stirred for one hour. The product is highly viscous and colourless.

EXAMPLE 6

12.9 Parts of Desmodur L (67% in ethyl glycol acetate/xylene 1:1) are diluted with 20 parts of ethyl glycol acetate/xylene (1:1) under a protective atmosphere. 9 Parts of a commercial methoxy polyethylene glycol having an average molecular weight of 750, dissolved in 10 parts of xylene, and 0.003 parts of dibutyl tin dilaurate are added. When 33% of the NCO groups have reacted at 50° C., 6 parts of the caprolactone polyester with an average molecular weight of 1000 described in Example of preparation II, dissolved in 20 parts of xylene, are added. The reaction is terminated as soon as 66% of the NCO groups have reacted. 1.4 Parts of 1-(2-hydroxyethyl)imidazole dissolved in 20.7 parts of xylene are added for addition to the remaining NCO groups and the reaction mixture is stirred at 70° C. for 2 hours.

The colourless, clear product is slightly viscous.

EXAMPLE 7

14.3 Parts of a polyester of adipic acid, dodecane diol and octanol having an average molecular weight of 1400 (Example of Preparation F) are dissolved at 50° C. in a mixture of 15 parts of ethyl glycol acetate and 10 parts of xylene under a protective atmosphere. The reaction mixture is cooled to 20° C. and 11.1 parts of Desmodur L (67% in ethyl glycol acetate/xylene 1:1) and 0.003 parts of dibutyl tin dilaurate are added with stirring. The reaction mixture is slowly heated to 50° C., and the progress of the reaction is followed by NCO determination. After one third of the NCO groups put into the process have reacted, 2.1 parts of polyethylene glycol having an average molecular weight of 400 dissolved in 20 parts of xylene are added and the second third of the NCO groups are left to react. The reaction mixture is then diluted with 11.4 parts of xylene, and 1.1 parts of N,N-dimethyl-1,3-diaminopropane dissolved in 15 parts of N-methylpyrrolidone are added. The reaction mixture is stirred at 50° C. for one hour.

EXAMPLE 8

8.8 Parts of Desmodur L (67% in ethyl glycol acetate/xylene 1:1) in 15 parts of ethyl glycol acetate are homogenised under a protective atmosphere and 15.5 parts of a caprolactone polyester which has been started on nonyl phenol ethyl oxylate (Example of Preparation G) dissolved in 12.2 parts of xylene as well as 0.002 parts of dibutyl tin dilaurate are added. The reaction mixture is heated to 50° C. and stirred until 30% of the NCO groups have reacted. It is then diluted with 20 parts of xylene, and 2.7 parts of commercial polytetrahydrofuran diol having an average molecular weight of 650, dissolved in 10 parts of xylene, are added.

As soon as 66% of the NCO groups put into the process have reacted, 0.9 parts of 4-(aminomethyl)-pyridine dissolved in 15 parts of xylene are added and the reaction mixture is heated to 70° C. and stirred at this temperature for one hour. The colourless product has a very low viscosity.

EXAMPLE 9

12.4 Parts of ethyl glycol acetate, 11 parts of Desmodur L (67% in ethyl glycol acetate/xylene 1:1) and 14.2 parts of a polyester of adipic acid, dodecane diol and octanol having an average molecular weight of 1400 (Example of Preparation F) dissolved in 20 parts of xylene are homogenised under a protective atmosphere, and 0.003 parts of dibutyl tin dilaurate are added. The reaction mixture is heated to 50° C. and the polyester is chemically added to the Desmodur L.

After this reaction step, 2.2 parts of a commercial coconut acid diethanolamide dissolved in 30 parts of ethyl glycol acetate/xylene (1:1) are added. The coconut acid diethanolamide has an average molecular weight of 440. As soon as two thirds of the NCO groups put into the process have reacted, 1.3 parts of 1-(3-aminopropyl)imidazole dissolved in 10 parts of NMP are rapidly added and the reaction mixture is heated to 70° C. and stirred at this temperature for one hour. The medium viscosity product is clear to slightly cloudy.

EXAMPLE 10

7.9 Parts of poly-isophorone diisocyanate (70% in ethyl glycol acetate/xylene 1:1) dissolved in 10 parts of ethyl glycol acetate and 15 parts of a valerolactone polyester having an average molecular weight of 2000 (Example of Preparation A) dissolved in 20 parts of xylene are homogenised under a protective atmosphere with exclusion of moisture. 0.003 Parts of dibutyl tin dilaurate are added and the reaction mixture is heated to 50° C. When the OH groups have completed their reaction, 3.7 parts of a polypropylene glycol having an average molecular weight of 1000 dissolved in 20 parts of xylene are added.

When 66% of the NCO groups put into the process have reacted, 7.6 parts of xylene and 0.8 parts of 3-mercapto-1,2,4-triazole dissolved in 15 parts of N-methylpyrrolidone are added and the reaction mixture is stirred for one hour at 60° C.

The solution of product has a low viscosity and a slightly brown colouration.

EXAMPLE 11

14.1 Parts of Desmodur HL (60% in butyl acetate) are dissolved in 20 parts of ethyl glycol acetate with exclusion of moisture, 11.6 parts of an 1100 caprolactone polyester (Example of Preparation B) dissolved in 20 parts of xylene and 0.003 parts of dibutyl tin dilaurate are added and the reaction mixture is slowly heated to 60° C.

The first stage is completed as soon as 30% of the NCO groups put into the process have reacted.

For the coupling reaction, 3.4 parts of commercial polytetrahydrofurane diol having an average molecular weight of 650 dissolved in 14.4 parts of xylene are added.

In the last stage, which follows the reaction of 60% of the NCO groups put into the process, 1.5 parts of 3-mercapto-1,2,4-triazole dissolved in 15 parts of N-methylpyrrolidone are added and the reaction mixture is heated to 70° C. and stirred at this temperature for one hour.

EXAMPLE 12

The reaction takes place at 50° C. under a protective atmosphere. 14.4 Parts of Desmodur HL (60% in butyl acetate) are dissolved in 15 parts of ethyl glycol acetate, and 9.9 parts of a caprolactone polyester which has been started on phenyl ethyl alcohol and has an average molecular weight of 1100 (Example of Preparation B) are added. The polyester is partly dissolved in 13 parts by weight of xylene.

When the polyester addition reaction has been completed, which can be seen by the reduction in NCO groups, 4.5 parts of polyethylene glycol having an average molecular weight of 1000 are added. To complete the reaction of the remaining NCO groups, 2.3 parts of 1-(2-aminoethyl)-piperazine are added and the reaction mixture is diluted with xylene to a solids content of 30%. The product is a slightly cloudy, viscous solution.

EXAMPLE 13

10.1 Parts of Desmodur HL (60% in butyl acetate) are diluted with 30 parts of a mixture of xylene/ethyl glycol acetate (1:1) under protective gas and 12.7 parts of a polyester having an average molecular weight of 2000 (Example of Preparation A) are added. After the addition of 0.003 parts of dibutyl tin dilaurate, the addition reaction is carried out at room temperature.

When 25% of the NCO groups have reacted, 4.7 parts of a polyethylene glycol having an average molecular weight of 1500 are added in the second stage.

When half the NCO groups have reacted, the reaction mixture is diluted with xylene to an end product solids content of 25%, 1.5 parts of 4-(2-aminoethyl)-pyridine are added, aand the mixture is heated to 60° C. and stirred at this temperature for one hour. The product has a slightly yellow colour and is viscous.

EXAMPLE 14

The reaction is carried out at 50° C. under a protective gas atmosphere, 6.3 Parts of Demodur HL (60% in butyl acetate) are diluted with a mixture of 15 parts of ethyl glycol acetate and 36 parts of xylene. 0.7 Parts of a polyethylene glycol having an average molecular weight of 400 and 19.6 parts of a caprolactone polyester having an average molecular weight of 5000 (Example of Preparation D) are added in the molten state. 0.002 Parts of dibutyl tin dilaurate are added to accelerate the reaction.

When all the OH groups have reacted, 0.9 parts of 4-(2-hydroxyethyl)-pyridine are added and the solids content of the reaction mixture is adjusted to 25% with xylene. The reaction mixture is stirred for one hour at 60° C. to complete the reaction. A colourless, low viscosity product is obtained.

EXAMPLE 15

10.7 Parts of Demodur HL (60% in butyl acetate) are homogenised under a protective atmosphere with a solution in 15.7 parts of xylene of 16.2 parts of a valerolactone polyester with an average molecular weight of 2000 which was started with heptadecafluorodecanol/2-ethylhexanol (Example of Preparation A). 0.001 Parts of dibutyl tin dilaurate are added and the addition reaction of the polyester is carried out at 50° C.

After termination of this reaction, the reaction mixture is diluted with 20 parts of ethyl glycol acetate and 0.3 parts of 1,4-butanediamine dissolved in 20 parts of xylene are added.

As soon as 55% of the NCO groups put into the process have reacted, the slightly exothermic reaction is stopped by the addition of 2.1 parts of 2-amino-6-methoxybenzothiazole dissolved in 15 parts of NMP. The reaction mixture is heated to 70° C. and stirred for one hour.

The product is a slightly viscous, yellowish, clear solution.

EXAMPLE 16

16.1 Parts of Desmodur IL (51% in butyl acetate) and 11 parts of a caprolactone polyester 1800 (Example of Preparation C) dissolved in 20 parts of xylene are added to 20 parts of ethyl glycol acetate/xylene (1:1) under a protective atmosphere and the addition is carried out at room temperature after the addition of 0.002 parts of dibutyl tin dilaurate as catalyst.

When 20% of the NCO groups have been used up, 3.8 parts of the polycaprolactone polyester described in Example of Preparation II dissolved in 17.1 parts of xylene are added.

After the NCO groups put into the process have been reduced to 55%, 10 parts of xylene and 2.0 parts of 4-(2-aminoethyl)-pyridine dissolved in 10 parts of diisobutyl ketone are added. The reaction mixture is heated to 50° C. and stirred for one hour. The colourless to slightly yellowish product has a low viscosity.

EXAMPLE 17

9 Parts of Desmodur IL (51% in butyl acetate) are homogenised with a solution of 17 parts of a polyester with an average molecular weight of 5000 (Example of Preparation D) in 25 parts of xylene under a protective atmosphere and with exclusion of moisture, and 0.003 parts of dibutyl tin dilaurate are added. The reaction is carried out at 60° C. After the polyester addition reaction, 2.5 parts of polypropylene glycol having an average molecular weight of 1000 dissolved in 30 parts of xylene are added. 0.002 Parts of dibutyl tin dilaurate are added to accelerate the reaction. When the hydroxyl groups have reacted, the reaction mixture is diluted with 5.6 parts of xylene, and 0.9 parts of 3-mercapto-1,2,4-triazole dissolved in 10 parts of N-methylpyrrolidone are added to the remaining NCO groups. The product has a medium viscosity and is yellowish in colour.

EXAMPLE 18

15.5 Parts of Desmodur IL (51% in butyl acetate) are homogenised under a protective atmosphere with 13.3 parts of a polyester having an average molecular weight of 1800 (Example of Preparation C) dissolved in 15 parts of xylene, 0.003 parts of dibutyl tin dilaurate are added and the reaction mixture is heated to 50° C. After the addition reaction of the polyester, which is recognised by reduction of the NCO groups by 25%, the reaction mixture is diluted with 20 parts of xylene, and 0.7 parts of 1,12-diaminododecane are added.

After the exothermic reaction, 14 parts of xylene and 1.5 parts of N,N-dimethyl-1,3-propanediamine dissolved in 20 parts of N-methylpyrrolidone are added. Stirring is continued for a further hour at 70° C. The product has a medium viscosity and is slightly cloudy.

EXAMPLE 19

15.5 Parts of Desmodur IL (51% in butyl acetate) are homogenised under a protective atmosphere with 30 parts of xylene/butyl acetate (4:1) and 26.6 parts of a polyester having an average molecular weight of 1800 (Example of Preparation C). When 0.003 parts of dibutyl tin dilaurate are added and the reaction mixture is heated to 50° C., half the NCO groups undergo reaction.

0.3 Parts of 1,4-butanediol dissolved in 30 parts of xylene are added. When, as a result, 75% of the NCO groups have undergone reaction, 0.6 parts of 3-amino-1,2,4-triazole dissolved in 10 parts of N-methylpyrrolidone are added, and the solids content is adjusted to 30% with xylene. The medium viscosity, yellowish product is stirred for one hour at 60° C.

EXAMPLE OF PRACTICAL APPLICATION

Milled material

25 Parts by weight of a 50% hydroxy-acrylate resin are mixed with 3 parts by weight of xylene and 1 part by weight of butyl acetate in a tempered (50° C.) refined steel stirrer vessel. X parts by weight of the addition compound according to the invention or of the comparison compound (Example 8 of U.S. Pat. No. 4,032,698) are then added, the mixture is homogenised, and Y parts by weight of a pigment (Table 1) are added. The parts by weight of the addition compound according to the invention and of the comparison compound are calculated as 100% solid bodies.

The mixture is homogenised, 200% by weight of steel beads, based on the grinding mixture, are added and the substance is dispersed for 40 minutes at 50° C. by stirring at the rate of about 12 m·s$^{-1}$ with a polypropylene disc adapted to the size of the vessel.

Stock lacquer

The lacquer medium, which has been prepared from 52 parts by weight of hydroxy-acrylate resin (50%), 6 parts by weight of xylene, 2 parts by weight of butyl acetate and 0.1 part by weight of a levelling additive, is added to the milled material. The mixture is stirred for 2 minutes at a rate of about 2 m·s$^{-1}$ to homogenise it. The steel balls are filtered off. This stock lacquer is left to stand for 12 to 15 hours before further treatment. Part of the stock lacquer prepared as described above is then processed as described below while another part of the stock lacquer is processed by the same manner after 14 days' storage at 50° C. The results obtained with the immediately processed lacquer are summarized in Table 2 while the results obtained with the lacquer which is processed after 14 days' storage are summarized in Table 3. For cross-linking, 30 parts by weight of a cross-linker containing 75% of triisocyanate (Desmodur N) are added to 100 parts by weight of stock lacquer and stirred in.

The viscosity of the finished lacquer is then adjusted to 16" DIN 4/23 by dilution with a mixture of xylene-/alkyl benzene (>C$_9$)/butyl acetate (2:2:1). After one hour, the adjusted lacquer is poured out on a cleaned glass plate inclined at an angle of 80°. After complete cross-linking, the lacquer film (coloured lacquer) is assessed for gloss and transparency and examined under a light microscope for the particle size and for the presence of flocculation.

The assessment is carried out according to a numerical scale of 0 to 10, where 0=no flocculation, high gloss and good transparency, and 10=complete flocculation, no gloss and no transparency.

The results obtained are entered in the line "Coloured lacquer" in Tables 2 and 3.

Another method of determining the pigment size distribution and pigment stabilization in the lacquer consists of mixing the lacquer with a white lacquer and then carrying out the rub-out test (white mixing). For this test, the lacquer which has been poured out on a surface is left exposed to air (about 10 minutes) and the sample is then rubbed with a finger until the colour is constant.

For this test, the stock lacquers of coloured pigments I to V entered in Table 1 are mixed with the white lacquer VI of Table 1 in the proportions 1:4, homogenised and adjusted to 16" DIN 4/23. The product is poured out on a glass plate inclined at an angle of 80° and the rub-out test is carried out after exposure to air (about 10 minutes). After complete cross-linking of the film, the intensity of colour both of the rubbed-out sample and of the sample which has not been rubbed out is determined. A scale from 0 to 10 is used for this purpose, where 0=same colour intensity, same colour shade, no flooding and floating, in other words no detectable difference between the rubbed-out sample and the sample which has not been rubbed out, and 10=completely altered colour intensity and flooding and floating of pigment.

The results obtained are shown in Tables 2 and 3 in the line "White mixture".

TABLE 1

| Pigment used | Y Parts by wt. | Addition compound according to the invention or comparison example* | X Parts by wt. |
|---|---|---|---|
| I a Polycyclic thio-indigo derivative | 4.5 | Example 14 | 0.67 |
| b C.I.1 Pigment red 88 C.I.2 17712 e.g. Novoperm Red-violet MRS | 4.5 | Comparison example | 0.67 |
| II a Polycyclic quinacridone derivative | 4.0 | Example 14 | 0.4 |
| b C.I.1 Pigment violet 19 C.I.2 46500 e.g. Quindo violet RV 6902 | 4.0 | Comparison example | 0.4 |
| III a Mono-azo-arylamide derivative | 5 | Example 14 | 0.5 |
| b C.I.1 Pigment orange 36 C.I.2 11780 e.g. Novoperm Orange HL 70 | 5 | Comparison example | 0.5 |
| IV a Polycyclic perylene derivative | 5 | Example 14 | 0.5 |
| b C.I.1 Pigment red 178 C.I.2 71155 e.g. Paliogen Red L 3910 HD | 5 | Comparison example | 0.5 |
| V a Anthraquinone derivative | 5 | Example 14 | 0.75 |
| b C.I.1 Pigment red 177 C.I.2 65 300 e.g. Cromophtal Red A2B | 5 | Comparison example | 0.75 |
| VI a Inorganic white pigment | 25 | Example 14 | 0.75 |
| b Titanium dioxide | 25 | Comparison example | 0.75 |

*Comparison example: Example 8 of US-A-4 032 698

TABLE 2

| Pigments | I | | II | | III | | IV | | V | |
|---|---|---|---|---|---|---|---|---|---|---|
| | a | b | a | b | a | b | a | b | a | b |
| Coloured lacquer | 0 | 5 | 0 | 6 | 0 | 5 | 1 | 7 | 1 | 9 |
| White mixture | 1 | 7 | 0 | 7 | 0 | 6 | 0 | 9 | 1 | 10 | a = addition compound according to the invention
b = comparison example

TABLE 3

| Pigments | I | | II | | III | | IV | | V* | |
|---|---|---|---|---|---|---|---|---|---|---|
| | a | b | a | b | a | b | a | b | a | b |
| Coloured lacquer | 0 | 6 | 0 | 6 | 0 | 6 | 0 | 7 | 0 | 10 |
| White mixture | 0 | 8 | 0 | 7 | 0 | 6 | 0 | 10 | 1 | 10 | a = addition compound according to the invention
b = comparison example

We claim:

1. Addition compounds and their salts obtained by
(a) reacting at least one polyisocyanate having an average functionality of 2.5 to 6 with at least one monohydroxyl compound of formula I $$Y\text{—}OH \qquad I$$

wherein Y is selected from the group consisting of
(i) aliphatic and cycloaliphatic hydrocarbon groups having 8 to 30 carbon atoms or in which the hydrogen atoms of the hydrocarbon groups are partly replaced by at least one substituent selected from the group consisting of halogens and aryl groups, and (ii) aliphatic, cycloaliphatic and aromatic groups having molecular weights of from 350 to 8000 which contain at least one group selected from the group consisting of —O— and 13 COO— or in which the hydrogen atoms of the aliphatic, cycloaliphatic and aromatic groups are partly replaced by halogens, in such a quantity that 15 to 50% of the NCO groups are reacted, (b) reacting the reaction product from step (a) with at least one compound of formula II $$G-(E)_n \qquad \qquad II$$

wherein E represents at least one group selected from the group consisting of —OH, —NH$_2$ and —NHR, R represents an alkyl group having 1 to 4 carbon atoms, n represents 2 or 3, and G represents a group selected from the group consisting of aliphatic, cycloaliphatic and aromatic groups having a molecular weight of at most 3000 and containing at least two carbon atoms, in such a quantity that a further 15 to 45% of the NCO groups of the polyisocyanate originally put into the process are reacted but the sum of the degrees of NCO reaction in steps (a) and (b) amounts to from 40% to 75%, and (c) reacting the reaction product from step (b) with at least one compound of formula III $$Z-Q \qquad \qquad III$$

wherein Q represents —OH, —NH$_2$, —SH, or —NHR', R' represents an alkyl group having 1 to 4 carbon atoms, and Z is an aliphatic group with 2 to 10 carbon atoms containing at least one tertiary amino group or comprises a heterocyclic group containing at least one basic ring nitrogen atom which does not carry a hydrogen atom, in such a quantity that at least one molecule of the compound Z—Q is available for each remaining isocyanate group unreacted in steps (a) and (b).

2. Addition compounds and their salts according to claim 1, wherein the monohydroxyl compounds of formula I are polyesters with average molecular weights $M_n$ of from 500 to 5000.

3. Addition compounds and their salts according to claim 1, wherein the compounds of formula II are polyoxyalkylene glycols.

4. Addition compounds and their salts according to claim 3, characterised in that the compounds II have average molecular weights $M_n$ of from 600 to 1500.

5. Addition compounds and their salts according to claim 3, characterised in that the polyoxyalkylene glycol is a polyethylene glycol.

6. Addition compounds and their salts according to claim 1, characterised in that in the compound of the formula III, Q stands for —NH$_2$.

7. Addition compounds and their salts according to claim 1, characterised in that in formula III, Z is a heterocyclic group which is attached to the group Q by way of a ring nitrogen atom and an alkylene group having 2 to 5 carbon atoms.

8. Addition compounds and their salts according to claim 1, wherein in formula III, the heterocyclic group is selected from the group consisting of triazole, pyrimidine, imidazole, pyridine, morpholine, pyrrolidine, piperazine, benzimidazole, benzothiazole, and triazine.

9. Addition compounds and their salts according to claim 2, wherein the compound of formula I is a polyester of an aliphatic lactone and an aliphatic monohydric alcohol having 4 to 18 carbon atoms.

10. Addition compounds and their salts according to claim 3, wherein said polyoxyalkylene glycols have an average molecular weight $M_n$ of from 400 to 2000.

11. Dispersing agents comprising the addition compounds and their salts according to claim 1.

12. Addition compounds and their salts according to claim 1, wherein the polyisocyanate is reacted with a compound containing amine hydrogen.

13. Addition compounds and their salts according to claim 1, wherein the polyisocyanate is reacted in the presence of a solvent.

14. Addition compounds and their salts according to claim 1, wherein the polyisocyanate is reacted in the presence of a reaction catalyst.

15. Addition compounds and their salts according to claim 1, wherein from 20 to 40% of the NCO groups of said polyisocyanate are reacted in step (a) and from 20 to 40% of the NCO groups are reacted in step (b), the total proportion of the NCO groups reacted in steps (a) and (b) amounting to from 45 to 65%.

16. Addition compounds and their salts according to claim 1, wherein from 20 to 35% of the NCO groups of said polyisocyanate are reacted in step (a) and from 20 to 35% of the NCO groups are reacted in step (b), the total prportion of the NCO groups reacted in steps (a) and (b) amounting to from 45 to 55%.

17. Addition compounds and their salts according to claim 1, wherein the group G contains a group selected from the group consisting of —O—, —COO—, —CONH—, —S—, and —SO$_2$—.

18. Addition compounds and their salts according to claim 1, wherein Z comprises a heterocyclic group attached directly to the group Q.

19. Addition compounds and their salts according to claim 1, wherein Z comprises a heterocyclic group attached to the group Q by an alkylene group having up to 10 carbon atoms.

20. A process for preparing addition compounds and their salts comprising (a) reacting polyisocyanates having an average functionality of from 2.5 to 6 with monohydroxyl compounds of formula I $$Y-OH \qquad \qquad I$$

wherein Y is selected from the group consisting of
(i) aliphatic and cycloaliphatic hydrocarbon groups with 8 to 30 carbon atoms or in which the hydrogen atoms of the hydrocarbon groups are partly replaced by at least one substituent selected from the group consisting of halogens and aryl groups, and (ii) aliphatic, cycloaliphatic and aromatic groups with molecular weights of from 350 to 8000 which contain at least one group selected from the group consisting of —O— and —COO— or in which the hydrogen atoms of the aliphatic, cycloaliphatic and aromatic groups are partly replaced by halogen, in such a quantity that from 15 to 50% of the NCO groups are reacted, (b) reacting the reaction product from step (a) with at least one compound of formula II $$G-(E)_n \qquad \text{II}$$

wherein E represents at least one group selected from the group consisting of —OH, —NH$_2$ and —NHR, R represents an alkyl group having 1 to 4 carbon atoms, n represents 2 or 3, and G represents a group selected from the group consisting of aliphatic, cycloaliphatic and aromatic groups having a molecular weight of at most 3000 and containing at least two carbon atoms, in such a quantity that a further 15 to 45% of the NCO groups of the polyisocyanate originally put into the process are reacted but the sum of the degrees of NCO reaction in steps (a) and (b) amounts to from 40% to 75%, (c) reacting the reaction product from step (b) with at least one compound of the formula III $$Z-Q \qquad \text{III}$$

wherein Q stands for —OH, —NH$_2$, —SH, or —NHR', R' represents an alkyl group having 1 to 4 carbon atoms, and Z is an aliphatic group with 2 to 10 carbon atoms containing at least one tertiary amino group or comprises a heterocyclic group containing at least one basic ring nitrogen atom which does not carry a hydrogen atom, in such a quantity that at least one molecule of the compound Z—Q is available for each remaining isocyanate group unreacted in steps (a) and (b).

21. A process according to claim 20, wherein the monohydroxyl compounds of formula I are polyesters with average molecular weights of M$_n$ of from 500 to 5000.

22. A process according to claim 20, wherein the compounds of formula II are polyoxyalkylene glycols.

23. Process according to claim 22, characterised in that the compounds II have average molecular weights M$_n$ of from 600 to 1500.

24. Process according to claim 22, characterised in that the polyoxyalkylene glycol is a polyethylene glycol.

25. Process according to claim 20, characterised in that in the compound of formula III, Q stands for —NH$_2$.

26. Process according to claim 20, characterised in that in formula III, Z is a heterocyclic group which is attached to the group Q by way of a ring nitrogen atom and an alkylene group having 2 to 5 carbon atoms.

27. A process according to claim 20, wherein in formula III, the heterocyclic group is selected from the group consisting of triazole, pyrimidine, imidazole, pyridine, morpholine, pyrrolidine, piperazine, benzimidazole and triazine.

28. A process according to claim 20, wherein the polyisocyanates are reacted with a compound containing amine hydrogen.

29. A process according to claim 20, wherein the polyisocyanate is reacted in the presence of a solvent.

30. A process according to claim 20, wherein the polyisocyanate is reacted in the presence of a reaction catalyst.

31. A process according to claim 20, wherein from 20 to 40% of the NCO groups of said polyisocyanate are reacted in step (a) and from 20 to 40% of the NCO groups are reacted in step (b), the total proportion of the NCO groups reacted in steps (a) and (b) amounting to from 45 to 65%.

32. A process according to claim 20, wherein from 20 to 35% of the NCO groups of said polyisocyanate are reacted in step (a) and from 20 to 35% of the NCO groups are reacted in step (b), the total proportion of the NCO groups reacted in steps (a) and (b) amounting to from 45 to 55%.

33. A process according to claim 20, wherein the group G contains a group selected from the group consisting of —O—, —COO—, —CONH—, —S—, and —SO$_2$—.

34. A process according to claim 20, wherein Z comprises a heterocyclic group attached directly to the group Q.

35. A process according to claim 20, wherein Z comprises a heterocyclic group attached to the group Q by an alkylene group having up to 10 carbon atoms.

36. A process according to claim 20, wherein the compound of formula I is a polyester of an aliphatic lactone and an aliphatic monohydric alcohol having 4 to 18 carbon atoms.

37. A process according to claim 20, wherein said polyoxyalkylene glycols have an average molecular weight M$_n$ of from 400 to 2000.

* * * * *

UNITED STATES PATENT AND TRADEMARK OFFICE
CERTIFICATE OF CORRECTION

PATENT NO. : 4,647,647
DATED : March 3, 1987
INVENTOR(S) : Haubennestel et al.

It is certified that error appears in the above—identified patent and that said Letters Patent is hereby corrected as shown below:

On the face of the patent, item [30] should read:
-- Foreign Application Priority Data
January 27, 1984 [DE] Fed. Rep. of Germany P 34 02 774
October 27, 1984 [EP] European Pat. Off. 84 112 971.1 --

Signed and Sealed this

Twenty-third Day of February, 1988

Attest:

DONALD J. QUIGG

Attesting Officer

Commissioner of Patents and Trademarks